(12) United States Patent

He et al.

(10) Patent No.: US 12,595,204 B2
(45) Date of Patent: Apr. 7, 2026

(54) COVER SUBSTRATES FOR DISPLAYS WITH DECORATIVE LAYERS HAVING INTEGRATED LOGIC CIRCUITS AND METHODS OF FORMING THE SAME

(71) Applicant: CORNING INCORPORATED, Corning, NY (US)

(72) Inventors: Mingqian He, Horseheads, NY (US); Xu Ouyang, Painted Post, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/722,773

(22) PCT Filed: Dec. 12, 2022

(86) PCT No.: PCT/US2022/052524
§ 371 (c)(1),
(2) Date: Jun. 21, 2024

(87) PCT Pub. No.: WO2023/129360
PCT Pub. Date: Jul. 6, 2023

(65) Prior Publication Data
US 2025/0051224 A1     Feb. 13, 2025

Related U.S. Application Data

(60) Provisional application No. 63/294,912, filed on Dec. 30, 2021.

(51) Int. Cl.
| | |
|---|---|
| *C03C 17/34* | (2006.01) |
| *C03C 3/085* | (2006.01) |
| *C03C 21/00* | (2006.01) |

(52) U.S. Cl.
CPC .............. *C03C 17/34* (2013.01); *C03C 3/085* (2013.01); *C03C 21/002* (2013.01);
(Continued)

(58) Field of Classification Search
None
See application file for complete search history.

(56) References Cited

U.S. PATENT DOCUMENTS

| | | | |
|---|---|---|---|
| 11,772,361 B2 | 10/2023 | Hawtof et al. | |
| 2009/0046073 A1 | 2/2009 | Pennington et al. | |

(Continued)

FOREIGN PATENT DOCUMENTS

| | | |
|---|---|---|
| WO | 2018/009504 A1 | 1/2018 |
| WO | 2018/075853 A1 | 4/2018 |

(Continued)

OTHER PUBLICATIONS

International Search Report and Written Opinion of the International Searching Authority; PCT/US2022/052524; mailed on Mar. 16, 2023, 12 pages; European Patent Office.

*Primary Examiner* — Laura C Powers

(74) *Attorney, Agent, or Firm* — Daniel J. Greenhalgh

(57) ABSTRACT

A glass article comprises a glass substrate having a first major surface and a second major surface, the second major surface being opposite the first major surface and a decorative ink layer disposed on the second major surface of the decorative ink layer and a conductive ink layer disposed on the second major surface. The conductive ink layer comprises conductive material dispersed in a dispersion medium and a sheet resistance that is less than a sheet resistance of the decorative ink layer. The conductive ink layer comprises a plurality of sensing structures arranged in a touch sensing circuit configured to vary in electrical properties in response to electromagnetic interactions with an external object.

11 Claims, 6 Drawing Sheets

(52) U.S. Cl.
    CPC .... *C03C 2217/47* (2013.01); *C03C 2217/485*
            (2013.01); *C03C 2217/72* (2013.01); *C03C*
                                    *2218/36* (2013.01)

(56) References Cited

U.S. PATENT DOCUMENTS

| | | | |
|---|---|---|---|
| 2013/0135233 A1 | 5/2013 | Wang et al. | |
| 2019/0012033 A1 | 1/2019 | Brandao Salgado et al. | |
| 2019/0315648 A1 | 10/2019 | Kumar et al. | |
| 2019/0329531 A1 | 10/2019 | Brennan et al. | |
| 2022/0194845 A1* | 6/2022 | Lesuffleur | C03C 3/078 |

FOREIGN PATENT DOCUMENTS

| | | | |
|---|---|---|---|
| WO | 2018/081068 A1 | 5/2018 |
| WO | 2018/213267 A1 | 11/2018 |
| WO | 2019/055458 A1 | 3/2019 |
| WO | 2019/055581 A1 | 3/2019 |
| WO | 2020/205519 A1 | 10/2020 |
| WO | 2021/118835 A1 | 6/2021 |

* cited by examiner

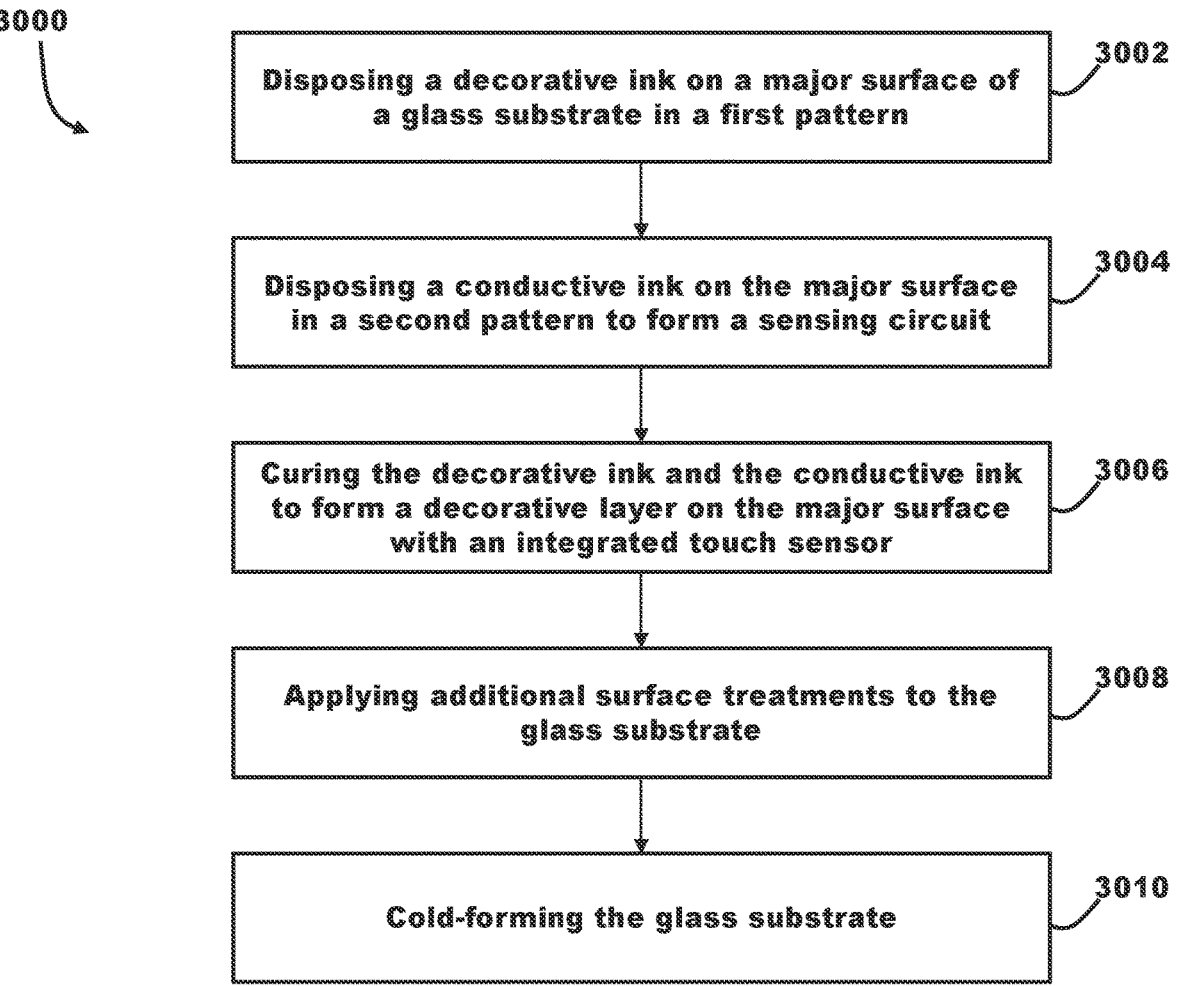

3000

Disposing a decorative ink on a major surface of a glass substrate in a first pattern — 3002

Disposing a conductive ink on the major surface in a second pattern to form a sensing circuit — 3004

Curing the decorative ink and the conductive ink to form a decorative layer on the major surface with an integrated touch sensor — 3006

Applying additional surface treatments to the glass substrate — 3008

Cold-forming the glass substrate — 3010

FIG. 8

COVER SUBSTRATES FOR DISPLAYS WITH DECORATIVE LAYERS HAVING INTEGRATED LOGIC CIRCUITS AND METHODS OF FORMING THE SAME

PRIORITY

This is a U.S. National Stage application under 35 U.S.C. § 371 of International Patent Application PCT/US2022/052524, filed on Dec. 12, 2022, which claims the benefit of priority under 35 U.S.C. § 119 of U.S. Provisional Application Ser. No. 63/294,912 filed on Dec. 30, 2021, the content of each of which is relied upon and incorporated herein by reference in its entirety.

FIELD

The disclosure relates to a decorated glass, and more particularly to a glass having a decorative layer disposed thereon having an integrated logic circuit formed at least in part of a conductive ink.

BACKGROUND

Displays may incorporate a touch interfacing using a touch panel. Existing touch panels incorporate conductive material that is patterned onto a substrate (e.g., formed of a suitable polymeric material or glass), with the substrate being subsequently laminated onto a cover glass of the display. The conductive material may be patterned to form touch sensing circuitry that may change in electronic properties (e.g., capacitance) when contacted by an external entity (e.g., a user's finger). In certain existing touch panels, transparent conductive oxides have been employed for the conductive material. Transparent conductive oxides are both costly and require complex manufacturing processes (e.g., sputtering, vapor deposition). Moreover, transparent conductive oxides (e.g., ITO) may be brittle and prone to breaking when the display is bent. Accordingly, there is a need for an alternative method of providing touch functionality to displays that is less costly and that results in the touch displays being more durable.

SUMMARY

One embodiment of the present disclosure relates to a glass article. The glass article comprises a glass substrate having a first major surface and a second major surface, the second major surface being opposite the first major surface and a decorative ink layer disposed on the second major surface of the decorative ink layer and a conductive ink layer disposed on the second major surface. The conductive ink layer comprises conductive material dispersed in a dispersion medium and a sheet resistance that is less than a sheet resistance of the decorative ink layer. The conductive ink layer comprises a plurality of sensing structures arranged in a touch sensing circuit configured to vary in electrical properties in response to electromagnetic interactions with an external object.

Another embodiment of the present disclosure relates to a vehicle interior system. The vehicle interior system includes a glass substrate comprising a decorative layer disposed on a major surface of the glass substrate. The decorative layer comprises a decorative ink and a conductive ink. The conductive ink comprises a conductive material dispersed in a dispersion medium such that the conductive ink comprises a sheet resistance that is less than that of the decorative ink.

The conductive ink is patterned into a plurality of sensing structures arranged in a touch sensing circuit. The vehicle interior system comprises a light source configured to emit light towards the major surface. The decorative layer is disposed between the glass substrate and the light source. The vehicle interior system comprises a circuit board conductively connected to the light source and the touch sensing circuit formed by the plurality of sensing structures of the decorative layer.

Another embodiment of the present disclosure relates to a method of fabricating a glass article. The method comprises disposing a decorative ink in a first pattern on a major surface of a glass substrate, wherein the decorative ink comprises a colorant; disposing a conductive ink in a second pattern on the major surface, wherein the second pattern comprises a plurality of sensing structures of the conductive ink that are arranged in a touch sensing circuit; and curing the decorative ink and the conductive ink on the major surface to form a decorative layer on the major surface with an integrated touch sensor, wherein, after curing, the conductive ink and the decorative ink comprise sheet resistances that differ from one another.

It is to be understood that both the foregoing general description and the following detailed description are merely exemplary, and are intended to provide an overview or framework to understanding the nature and character of the claims. The accompanying drawings are comprised to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8 shows a process for fabricating a glass article with an integrated touch sensor, according to one or more embodiments of the present disclosure.

DETAILED DESCRIPTION

Figure 1:
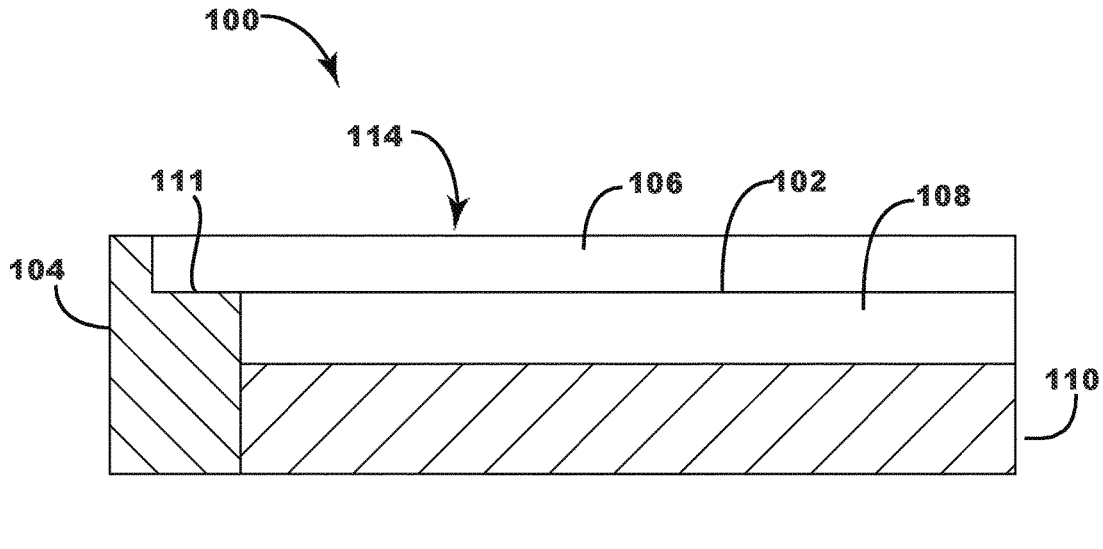
FIG. 1 schematically depicts a partial cross-sectional view of an electronic device, according to one or more embodiments of the present disclosure.

Referring generally to the figures, various embodiments of glass articles comprising glass substrates having touch sensing circuits formed of a conductive ink disposed thereon are described herein. The glass articles may comprise both a decorative ink and a conductive ink disposed on a major surface of the glass substrate, with the decorative ink and the conductive ink being disposed in different patterns such that the glass substrate exhibits a desired appearance (e.g., in terms of color and pattern via the decorative ink) and is also capable of providing touch functionality when coupled to a suitable power source. In embodiments, the conductive ink is disposed on the major surface of the glass substrate in a pattern to form a plurality of sensing structures that are arranged in a touch sensing circuit. Circuitry coupled to the touch sensing circuit may measure time-varying properties of the touch sensing circuit (e.g, a changing capacitance as a result of contact between the glass substrate and an external entity such as a user's finger) to provide inputs that are used to control another system (e.g., a display unit or other suitable device such as a fan, sound system, or any other electrically-controlled apparatus) associated with the glass article. Certain existing components providing such touch functionality utilize multiple substrates (e.g., both a cover substrate and a touchpanel substrate) to provide such touch functionality, which creates complexity and cost in the manufacturing process. The glass articles herein beneficially eliminate the need for a separate touch panel substrate by utilizing conductive inks disposed on the cover substrate to form the touch sensing circuit, thereby simplifying the manufacturing process of touch displays and reducing production costs.

In aspects, the conductive inks described herein may comprise transparent (e.g., comprising an optical transmission of greater than or equal to 10% throughout the visible spectrum) or non-transparent (e.g., comprising an optical transmission of less than 10% throughout the visible spectrum) conductive inks that comprise a conductive material dispersed in a suitable dispersion medium. The conductive ink, when in an uncured state, may have a viscosity suitable for inkjet printing methods, which may facilitate the conductive ink being deposited onto the glass substrate in a desired pattern. Such patterned deposition may eliminate the need to pattern deposited ink layers, thereby saving material costs and improving process efficiencies. In embodiments, the conductive material of the conductive ink comprises one or more of metallic nanoparticles, metallic nanowires, conductive polymers, carbon nanotubes, and graphene structures. The conductive inks described herein may not employ commonly used conductive oxide materials (such as indium tin oxide) that may require costly deposition processes (e.g., sputtering, vaper deposition), which may diminish the strength of the glass substrate (particularly if the glass substrate is chemically strengthened). In an example, the conductive inks described herein may be disposed directly on a chemically strengthened glass substrate, and the glass substrate may retain a relatively high flexural strength. Unlike transparent conductive oxides that are commonly employed in touch panels, the conductive inks of the glass articles described herein may not substantially diminish the surface strength of the glass substrate (e.g., by more than 10%). The relatively high surface strength of the glass articles described herein may facilitate incorporating components meeting regulatory requirements for certain applications (e.g., such as headform impact testing requirements for automotive interior displays).

In further aspects, the decorative layers described herein facilitate providing touch functionality to a variety of components that may be incorporated into vehicle interior systems, such as vehicle interior displays and vehicle interior trim elements including touch controls (e.g., backlit icons, decorative surfaces, and the like).

In further aspects, the conductive and decorative inks described herein may be combined in a variety of structures on the glass substrate based on the needs of the particular application. For example, in embodiments, the conductive ink may be disposed on the decorative ink and not contact the major surface of the glass substrate. The decorative ink may have a relatively low optical transmission (e.g., less than 10% throughout the visible spectrum) and thus obscure the conductive ink from being visible when viewed from the opposite surface of the glass substrate. Accordingly, relatively large sensing structures (e.g., electrodes) may be formed in any suitable arrangement without effecting the appearance of the article. In embodiments, the conductive ink may be selected to match a color of the decorative ink and be unnoticed even if disposed between the glass substrate and the decorative ink layer. In embodiments, the conductive inks may be transparent (e.g., have a transmittance of greater than 10% throughout the visible spectrum for light normally incident thereon) and/or be used to form sensing structures having a maximum width in the direction of the major surface that is less than or equal to 100 μm. As a result of such transparency and/or small feature size, the conductive inks described herein may not be noticed when incorporated over a display panel. Accordingly, the glass articles described herein may employ a wide variety of conductive and decorative inks tailored to various applications, while providing the production efficiencies described herein.

While the examples described herein involve the formation of touch sensing circuits directly on cover glass substrates, it should be appreciated that the decorative layers described herein may be used to form other logic circuits performing other functions (e.g., associated with on-board vehicle sensors or the like).

FIG. 1 is a partial cross-sectional view of an electronic device 100 comprising a touch interface 102, according to one or more embodiments of the present disclosure. The touch interface 102 is a component of a glass article 106 of the electronic device as a portion of a decorative layer thereof, as described in greater detail herein. In embodiments, the electronic device 100 is a standalone device, such as a laptop computer, a tablet computer, a smart-phone, a digital music player, portable gaming station, a television, etc. That is, a "standalone electronic device" 100 is primarily a display screen or interactive panel not incorporated into another structure, device, or apparatus. In other embodiments, the electronic device 100 is incorporated into another structure, device, or apparatus. For example, the electronic device 100 may be a control panel, e.g., in a vehicle, on an appliance, for an elevator, etc., that allows for interaction with the structure, device, or apparatus.

In the embodiment depicted in FIG. 1, the electronic device 100 comprises the touch interface 102, a housing 104, the glass article 106, a light source 108, and a circuit board 110. The housing 104 at least partially surrounds the touch interface 102, and in the embodiment depicted, provides a seating surface 111 for the glass article 106. It should be understood that the seating surface 111 is optional and that the structure of the housing 104 is not particularly limiting. In embodiments, the light source 108 is a display panel (e.g., a suitable LCD display panel, OLED display panel, or other suitable type of display panel) or a component thereof (e.g., a backlight) and the glass article 106 functions a decorative cover glass for the display panel. In such embodiments, the touch interface 102 may comprise a conductive ink that is disposed onto the glass article 106 via a suitable deposition technique (e.g., screen printing inkjet printing, spraying, or other suitable technique). The conductive ink may provide touch functionality to the display panel, thereby eliminating the need for a separate touch panel substrate and simplifying fabrication of the touch display.

As a result of the touch interface 102 provided via the conductive inks of the glass article 106 described herein, the electronic device 100 may comprise a touch display where the glass article 106 is laminated directly to a polarization film or color filter layer associated with the light source 108 (e.g., when the light source 108 is a LCD panel comprising a backlight, an LCD layer a color filter, and a polarization film). For example, the glass article 106 may be directly laminated to a polarization film associated with a LCD panel via a suitable optically clear adhesive (not depicted in FIG. 1). The decorative layers described herein may incorporate touch functionality without the need for an additional touch panel substrate on which the touch sensing circuitry is formed, thereby simplifying production.

In embodiments, the light source 108 comprises one or more illumination sources (e.g, a light emitting diode or an array thereof, lasers, light bulbs, or other suitable illumination source) configured to emit light that is at least partially transmitted through the glass article 106. As described herein, the glass article 106 may comprise a decorative layer comprising a decorative ink that is patterned such that the light from the light source 108 is transmitted through the glass article 106 in a desired pattern (e.g., as a light-up icon or the like). When the electronic device 100 is integrated into a control system or the like (e.g. associated with an automobile), a user may interact with the touch interface 102 by contacting a portion of the glass article 106 through which the light from the light source 108 is transmitted to provide inputs that may be used to control another component (e.g., a sound system, a fan, a display, any other electrically-controllable component) communicably coupled to the control system.

While the light source 108 is depicted as a single light source in FIG. 1, it should be understood that embodiments are envisioned where the electronic device 100 comprises multiple light sources. For example, in embodiments, multiple display panels may be adhered to the glass article 106. In embodiments, the glass article 106 may serve as a cover for multiple light emitting components. For example, the decorative layer 120 (see FIG. 2) described herein may define a display area overlapping a display panel as well as an opaque region, and an outline for a backlit icon may be formed in the decorative layer 120 (e.g., via the decorative inks described herein). The electronic device 100 may incorporate any number and combination of light sources to provide various functionalities via the touch interface 102, as described herein. The glass article 106 may incorporate any number of electrically isolated touch sensor circuits formed in the decorative layer described herein to allow touch inputs to be received from various portions of the electronic device 100.

In embodiments, when the electronic device 100 is a standalone device, the housing 104 provides one or more boundaries of the electronic device 100. In embodiments, when the electronic device 100 is incorporated into another structure, device, or apparatus, the housing 104 may provide a mount for the electronic device 100 within the larger overall structure, device, or apparatus. Whether the electronic device 100 is integrated into another apparatus or used as a standalone device, the glass article 106 covers at least a portion of the touch interface 102 and may be seated into the housing 104 to as to provide a substantially planar viewing surface, depicted as a first major surface 114 of the glass article 106. The viewing surface may be any suitable shape (e.g., curved) in various embodiments other than those shown. The circuit board 110 supplies power to the touch interface 102 and to the light source 108.

In embodiments, the touch interface 102 comprises a plurality of sensing structures (e.g, electrodes and traces) formed of a conductive ink and arranged in a touch sensing circuit comprising one or more nodes at which electrical properties of the touch sensing circuit (e.g, capacitance) are measured in order to detect one or more touch or capacitive inputs, such as due to the placement of a user's finger, stylus, or other interaction device close to or on the glass article 106. The touch interface 102 may generally be any type of interface configured to detect changes in capacitance or other electrical parameters that may be correlated to a user input. The touch interface 102 may be operably connected to and/or in communication the circuit board 110. The touch interface 102 is configured to receive inputs from an object (e.g, location information based on a user's finger or data from the input device) that are used to control another component (e.g., the light source 108, a display, or other suitable component).

Figure 2:
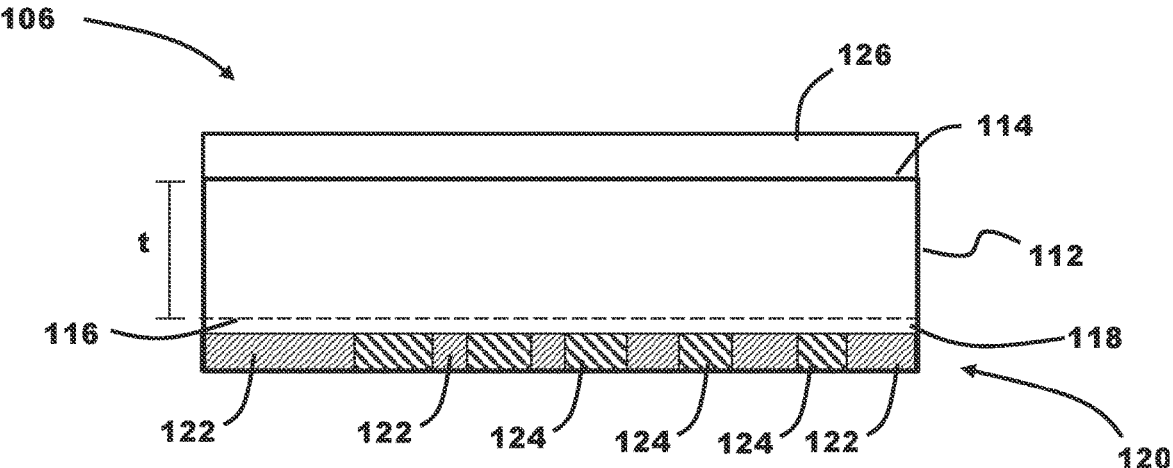
FIG. 2 schematically depicts a side-view of the layers of a glass article including a decorative layer with an integrated touch interface, according to one or more embodiments of the present disclosure.

FIG. 2 schematically depicts a side-perspective view of the glass article 106 of the electronic device 100 depicted in FIG. 1, according to one or more embodiments of the present disclosure. As depicted in FIG. 2, the glass article 106 comprises a glass substrate 112 and a decorative layer 120 comprising one or more decorative ink portions 122 and one or more conductive ink portions 124. In embodiments, the glass substrate 112 is a transparent glass. For example, suitable glass substrates 112 may comprise at least one of silicates, borosilicates, aluminosilicates, aluminoborosilicates, alkali aluminosilicates, and alkaline earth aluminosilicates, among others. Such glasses may be chemically or thermally strengthened, and embodiments of such glasses are described in greater detail herein. In embodiments, the glass substrate 112 comprises a first major surface 114, a second major surface 116, and a thickness t, extending between the first major surface 114 and the second major surface 116, of no more than about 2 mm, no more than about 0.8 mm, or no more than about 0.55 mm.

In embodiments, the glass article 106 optically comprises a semi-transparent layer 118 disposed on the second major surface 116 between the glass substrate 112 and the decorative layer 120. In embodiments, the semi-transparent layer 118 is be applied overall or a substantial portion of the second major surface 116, and the decorative layer 120 may be applied over the semi-transparent layer 118. In embodiments, the semi-transparent layer 118 may be disposed at least partially over the decorative layer 120 (e.g., such that the semi-transparent layer 118 is disposed between the second major surface 116 and the decorative layer 120).

In embodiments, the semi-transparent layer 118 is configured to provide a color-matching or deadfront effect to effectively conceal the appearance of the light source 108 and/or circuit board 110 (see FIG. 1) when the electronic device 100 is viewed from the side of the first major surface 114. In order to provide such a color matching or deadfront effect, the semi-transparent layer 118 in the display viewing regions 130 may have transmission coefficient of 0.05 to 0.85 (e.g., from 0.1 to 0.85, from 0.2 to 0.8, from 0.2 to 0.75) for light within the visible spectrum and normally incident on glass substrate 112. That is, the semi-transparent layer 118 may transmit between 5% and 85% of light in the visible spectrum (i.e., light having a wavelength of 400 nm to 700 nm) that is incident upon the first major surface 114. In embodiments, the semi-transparent layer 118 may provide a color matching effect if the transmission coefficient is from 0.5 to 0.85. In embodiments, the semi-transparent layer 118 may provide a deadfront effect if the transmission coefficient is from 0.2 to 0.7. As can be seen, there may be an overlap between the transmission coefficient for color matching and deadfronting because the visibility of an object behind the glass article 106 depends on certain characteristics of the object, such as the reflectivity of the object. Thus, an object that reflects less light may achieve a deadfront effect at a higher transmission coefficient, whereas an object that reflects more light may require a lower transmission coefficient just to achieve color matching. Accordingly, the particular optical requirements for the semi-transparent layer 118 may depend on the appearance of the glass article 106 and/or incorporating electronic device 100 (e.g., the color/pattern formed by the decorative ink of the decorative layer 120, the appearance of the housing 104, the type of conductive ink used in the decorative layer 120).

In embodiments, the semi-transparent layer 118 may conceal the one or more conductive ink portions 124 from view even when disposed over a relatively transparent portion of the glass article 106 (e.g., a portion of the glass substrate 112 that is not covered by the one or more decorative ink portions 122). As such, incorporation of the semi-transparent layer 118 may facilitate forming relatively large sensing structures out of the conductive ink without effecting the appearance of the electronic device 100, even when the conductive ink is not optically transparent.

In embodiments, the semi-transparent layer 118 is printed onto the second major surface 116 (or, in embodiments, on the decorative layer 120). In embodiments, the semi-transparent layer 118 is printed via inkjet printing, slot printing, screen printing, pad printing, or gravure printing, among others. In embodiments, the semi-transparent layer 118 has a thickness of no more than 50 μm. In other embodiments, the semi-transparent layer 118 has a thickness of no more than 30 μm, and in still other embodiments, the semi-transparent layer 118 has a thickness of no more than 20 μm. In embodiments, the semi-transparent layer 118 has a thickness of at least 0.05 μm.

In embodiments, the semi-transparent layer 118 is selected and printed in such a way that the semi-transparent layer 118 has a neutral appearance. In embodiments, for example, with respect to the CIE L*a*b* color space, a* and b* are no more than 5 for the semi-transparent layer 118. In embodiments, a* and b* are no more than 2, and in still other embodiments, a* and b* are no more than 1. In particular embodiments, a* and b* are 0. In embodiments, L* is less than 50. In other embodiments, L* is less than 30, and in still other embodiments, L* is less than 20. In embodiments, the semi-transparent layer 118 comprises dyes and/or pigments, such as carbon black. Further, in embodiments, the semi-transparent layer 118 is CMYK composite black (i.e., a mixture of cyan, magenta, and yellow ink). In other embodiments, the semi-transparent layer 118 is a CMYK rich black (i.e., a mixture of cyan, magenta, yellow, and black ink). In still other embodiments, the semi-transparent layer 118 is printed using just K (black) ink or LK (light black) ink according to CMYK. In embodiments, the transmittance of the semi-transparent layer 118 is controlled by diluting the ink with solvent. Specifically, a more dilute ink will produce a semi-transparent layer 118 having a higher transmittance that a less dilute ink.

Referring to FIGS. 1-2, the decorative layer 120 may both provide the glass article 106 with a desired appearance when the glass article 106 is viewed from the first major surface 114 and add touch functionality to the electronic device 100 (see FIG. 1) via the conductive ink described herein. In embodiments, the one or more decorative ink portions 122 are formed of a non-conductive ink, while the one or more conductive ink portions 124 are formed of a conductive ink comprising a conductive network (e.g., a network of fused metallic nanowires, a conductive polymer network, a plurality of metal nanoparticles, a graphene-based ink). The one or more conductive ink portions 124 may have a sheet resistance (e.g., an electrical sheet resistance) that is less than that associated with the one or more decorative ink portions 122 so that a suitable pattern of relatively high conductivity can be formed in the decorative layer 120 via the one or more conductive ink portions 124. While the one or more decorative ink portions 122 and the one or more conductive ink portions 124 are each depicted in FIG. 2 as comprising a plurality of separation sections of the respective inks disposed therein, it should be understood that embodiments of the glass article 106 may comprise one or more continuous sections of the conductive and decorative inks described herein having any suitable shape and arranged in any pattern. The particular number, arrangement, size, and shape of the one or more conductive ink portions 124 and one or more decorative ink portions 122 will vary depending on the application and design of the electronic device 100.

In embodiments, the one or more decorative ink portions 122 comprise a decorative ink that at least in part determines an external appearance of the glass article 106 (e.g., when viewed from the first major surface 114). In embodiments, the decorative ink used to form the one or more decorative ink portions 122 comprises inorganic or dielectric pigments of a suitable color, disposed in a suitable dispersion medium (e.g., comprising an organic binder and a solvent prior to curing) based on the deposition method used. Suitable inks may latex inks, UV-curable inks, or any other suitable decorative ink. In embodiments, the composition of the decorative ink (e.g., the colorant or pigment) within each of the one or more decorative ink portions 122 may vary as a function of position on the glass article 106 such that the portions of the glass article 106 overlapping the one or more decorative ink portions 122 exhibit a suitable pattern (e.g., a wood grain pattern, a marble pattern, any other suitable colorant pattern) when viewed from the first major surface 114. In embodiments, for example, the colorants used in the one or more decorative ink portions 122 may be determined at least in part based on the appearance of vehicle interior components, such that, when incorporated into the vehicle, the electronic device 100 fits the overall aesthetic of the vehicle interior. The one or more decorative ink portions 122 may be applied to the second major surface 116 (or semi-transparent layer 118) using screen printing, inject printing, spin coating, and various lithographic techniques, among others. In embodiments, the decorative ink portions 122 have a thickness of from 1 μm to 20 μm.

In embodiments, at least some of the one or more decorative ink portions 122 may be used to conceal other components of the electronic device 100. In embodiments, the one or more decorative ink portions 122 exhibit an optical transmission of less than or equal to 10% (e.g., less than or equal to 5%, less than or equal 1%, less than or equal to 0.5%) throughout the visible spectrum so as to block the visibility of other components. For example, the one or more decorative ink portions 122 may be used to block visibility of connections to the light source 108 below the glass article 106, a border of the light source 108, circuitry, etc. In embodiments, the one or more decorative ink portions 122 are selected to be gray or black in color; however, other colors are also possible depending on the need to match any other colors in the glass article 106. It should be understood that embodiments are also envisioned where the at least some of the one or more decorative ink portions 122 are not used to conceal other components of the electronic device 100 and relatively transparent decorative inks (e.g., having optical transmissions above 10% or 20% throughout the visible spectrum) may also be used. In embodiments, the one or more decorative ink portions 122 may be used to impart any desired visual quality to the glass article 106, whether in terms of color or other optical transmission/reflection characteristics.

In embodiments, the one or more conductive ink portions 124 are formed of an electrically conductive ink which comprises a sheet resistance of less than or equal to 1000 Ω/sq (e.g., less than or equal to 800 Ω/sq, less than or equal to 600 Ω/sq, less than or equal to 400 Ω/sq, less than or equal to 200 Ω/sq). The electrically conductive ink may comprise a suitable electrically conductive material (e.g., metallic nanowires, metallic particles, conductive polymers, carbon nanotubes, or other suitable material) dispersed in a dispersion medium (e.g., a solvent, a binder, and other suitable additives) configured to provide the ink with suitable properties (e.g., viscosity) for a desirable deposition method (e.g., inkjet printing screen printing, spraying, spin coating). The conductive ink used to form the one or more conductive ink portions 124 may be a suitable commercially available transparent conductive ink (e.g., having an optical transmission of greater than or equal to 20% throughout the visible spectrum) or non-transparent ink (e.g., having an optical transmission of less than 20% throughout the visible spectrum) depending on the structure of the decorative layer 120, as described herein with respect to FIGS. 4A and 4B. In embodiments, the one or more conductive ink portions 124 may have relatively low curing temperatures (e.g. curing temperatures of less than or equal to 200° C., less than or equal to 180° C., less than or equal to 150° C.), and/or avoid heating the glass substrate 112 to such temperatures during curing. Such low curing temperatures may beneficially facilitate the glass substrate 112 retaining a relatively high surface strength.

In embodiments, at least some of the one or more conductive ink portions 124 are formed to be components (or sensing structures) of a touch sensing circuit to provide touch functionality to the electronic device 100. In embodiments, the one or more conductive ink portions 124 form electrodes and conductive traces associated with a suitable capacitive touch sensor (e.g., a zero-dimensional sensor configured to detect the present or absence of contact with the glass article 106, e.g., to implement a key, a one dimensional sensor configured to detect a linear movement of a point of contact along the glass article 106 so as to implement a slider or wheel touch sensor, and a two-dimensional sensor configured to detect a movement of a point of contact along two axes, to implement a touch pad or display). The one or more conductive ink portions 124 may form a touch sensor of a single-layer construction (where the electrodes are all formed within the same plane, for example, on the second major surface 116 or on a decorative ink layer). In embodiments, for example, the one or more conductive ink portions 124 are used to form a plurality of electrodes arranged in a suitable pattern to form a plurality of transmission and receiver electrode pairs of a mutual-capacitance touch sensor. Such electrode pairs may be conductively coupled to circuitry (e.g., in the circuit board 110) via conductive traces for detecting contact events. Embodiments are also envisioned where each of the one or more conductive ink portions 124 forms an electrode in a self-capacitance-based circuit, where an array of such electrodes is formed to provide dimensional touch sensing. Electrode matrices may also be formed to provide two-dimensional touch-sensing capabilities. The electrode matrices may be attached to the circuit board 110 via suitable tracing scheme so as allow the measurement of electrical properties of the touch sensing circuit at a plurality of different points in space so as to provide any desired level of touch sensing functionality. Any suitable pattern of the conductive ink may be used to form any suitable touch sensing circuit.

In embodiments, combinations of different touch sensing circuits are formed in the decorative layer 120. For example, the conductive ink may be used to forma first touch sensing circuit having two-dimensional functionality in a first region of the glass substrate 112 (e.g., corresponding to a display viewing region defined by the one or more decorative ink portions 122) and a second touch sensing circuit that is electrically isolated from the first touch sensing circuit (e.g., the touch sensing circuits may possess independently measurable electrical properties) in a second region of the glass substrate (e.g., overlapping a backlit icon and providing control inputs separate from the display). Any number of separate touch sensing circuits providing various forms of touch sensing to separate regions of the glass substrate 112 may be provided in accordance with the present disclosure.

As shown in FIG. 2, in embodiments, the glass article 106 comprise one or more surface treatments 126. While the one or more surface treatments 126 are depicted to be disposed on the first major surface 114, the one or more surface treatments 126 may also be disposed on one or both of the first major surface 114 and the second major surface 116. The one or more surface treatments 126 can be provided through addition or removal of material from the first or second major surface 114, 116. For example, the one or more surface treatments 126 can be applied by coating the first or second major surface 114, 116. In another example, the one or more surface treatments 126 can be a removal of material from the first or second major surface 114, 116 such as through etching. Exemplary surface treatments comprise anti-fingerprint, anti-reflection, and anti-glare. In an embodiment, one or both of the anti-fingerprint and anti-reflection treatments are applied to first major surface 114, and the anti-glare treatment is applied to second major surface 116.

Figure 3A:
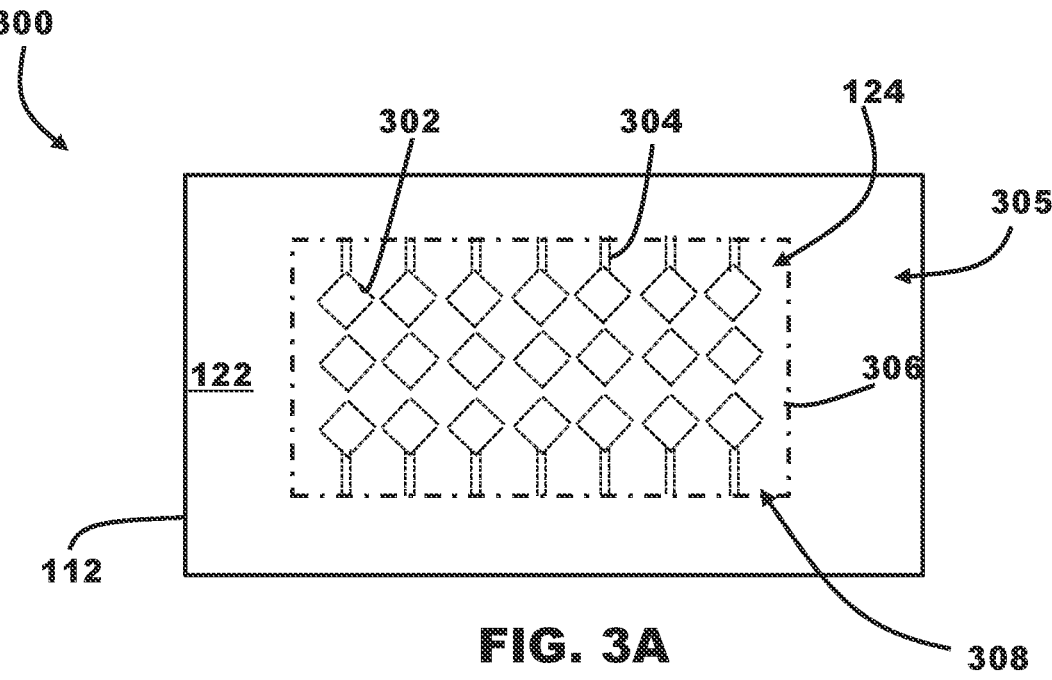
FIG. 3A schematically depicts a glass article including a glass substrate with example patterns of decorative ink and conductive ink formed thereon, according to one or more embodiments of the present disclosure.
Figure 3B:
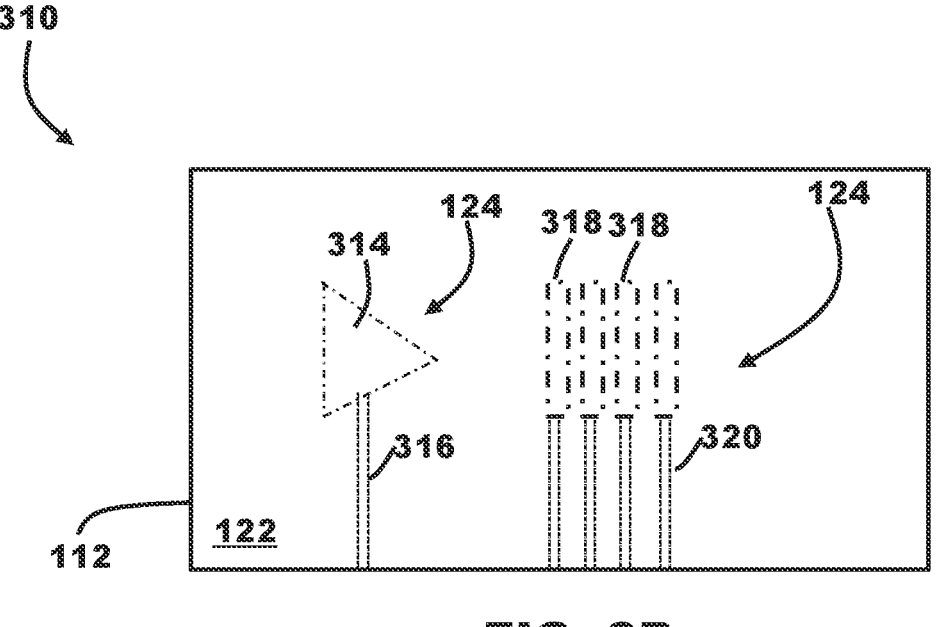
FIG. 3B schematically depicts a glass article including a glass substrate with example patterns of decorative ink and conductive ink formed thereon, according to one or more embodiments of the present disclosure.

FIGS. 3A and 3B schematically depict glass articles 300 and 310 each comprising the glass substrate 112 described herein with respect to FIGS. 1-2. The glass article 300 depicted in FIG. 3A comprises one or more decorative ink portions 122 formed of decorative ink and patterned to define a border region 305 having an interior boundary 306 that defines a display viewing region 308 devoid of the decorative ink. In embodiments, the optical transmission of the glass article 300 is higher in the display viewing region 308 than in the border region 305. The decorative ink in the border region 305 may be of any suitable color or pattern and be used to conceal various components (e.g., electrical connections, the housing 104 (see FIG. 1)). In embodiments, the relatively high optical transmission of the display viewing region 308 renders the display viewing region 308 suitable for lamination of a display panel or other light source thereto. For example, the lateral extent of the display viewing region 308 may correspond to that of a light emission surface of a display panel such that an image generated by the display panel is viewable through the glass article 300.

As shown in FIG. 3A, the one or more conductive ink portions 124 are patterned to form a plurality of electrodes 302 that are disposed in the display viewing region 308 and a plurality of conductive traces 304 electrically connected to the plurality of electrodes 302 and extending towards the border region 305. In embodiments, the plurality of conductive traces extend outward to a periphery of the glass article 300 to facilitate electrical connection with a circuit board 110 (see FIG. 1) used to power the plurality of electrodes 302 and measure the electrical properties of the touch sensing circuit formed by the plurality of electrodes 302. The plurality of electrodes 302 and portions of the plurality of conductive traces 304 are depicted to be disposed on the display viewing region 308 that is devoid of decorative ink. Such an arrangement facilitates overlap with the display panel or other light source to provide touch functionality to the display. In embodiments, the one or more decorative ink portions 122 are used to conceal the plurality of conductive traces 304 extending through the border region 305. For example, the conductive traces may be formed of a non-transparent conductive ink and the decorative ink may be used to conceal the appearance of the traces.

The glass article 310 depicted in FIG. 3B includes one or more decorative ink portions 122 that outline a first backlit icon 314 and a plurality of backlit icons 318. The one or more conductive ink portions 124 comprise conductive ink forming electrodes that overlap the boundaries of the first backlit icon 314 and the plurality of backlit icons 318. For example, the electrode overlapping the first backlit icon 314 may form a key or zero-dimensional touch function, configured to sense the presence and/or absence of a contactor. In the example shown, the first backlit icon 314 forms a play button that may be associated with an entertainment system of a vehicle. The electrodes overlapping the plurality of backlit icons 318 may be configured as a slider to provide intensity controls (e.g., volume controls) to media being played by the entertainment system. The one or more conductive ink portions 124 also include one or more conductive traces 316 extending from the first backlit icon 314 and a plurality of conductive traces 320 extending from the plurality of backlit icons 318 to facilitate connection with a circuit board or the like. The electrodes of the glass articles 300 and 310 described herein with respect to FIGS. 3A and 3B may be any suitable shape to implement any suitable type of single plane touch sensor (e.g., a self-capacitance-based sensor, a mutual-capacitance-based sensor).

Figure 4A:
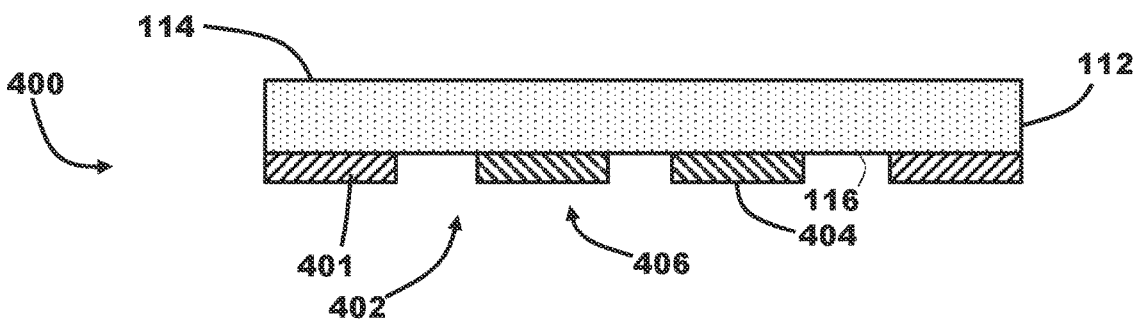
FIG. 4A schematically depicts a cross-sectional view of a glass article comprising a glass substrate and conductive ink and decorative ink layers disposed directly on the glass substrate, according to one or more embodiments of the present disclosure.
Figure 4B:
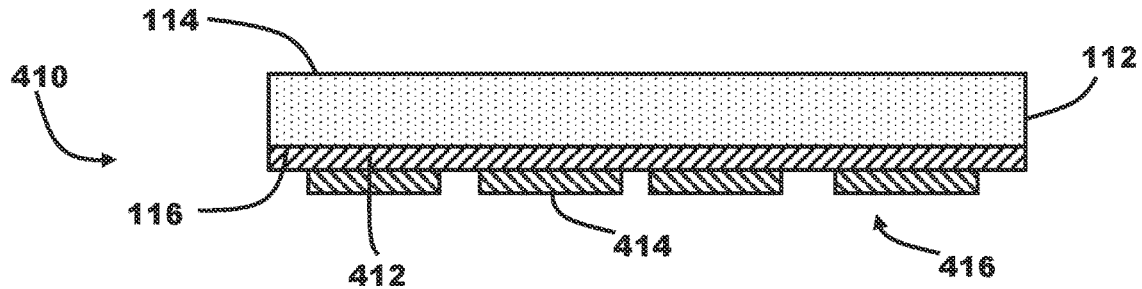
FIG. 4B schematically depicts a cross-sectional view of a glass article comprising a glass substrate, a decorative ink layer disposed on the glass substrate, and a conductive ink layer disposed on the decorative ink layer, according to one or more embodiments of the present disclosure.
Figure 4C:
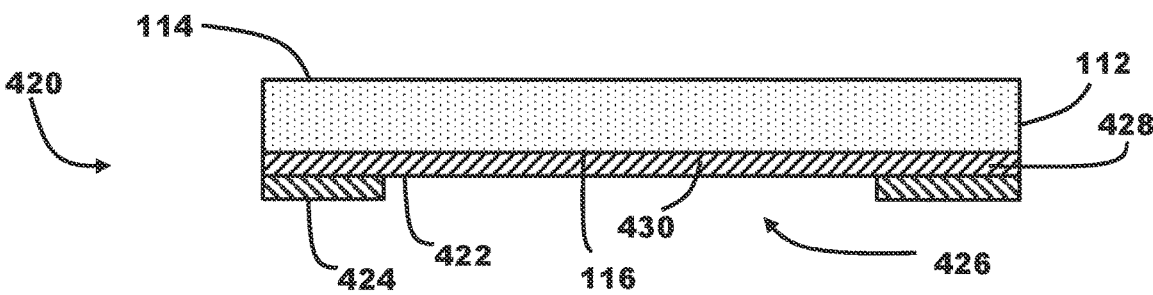
FIG. 4C schematically depicts a cross-sectional view of a glass article comprising a glass substrate, a conductive ink layer disposed on the glass substrate, and a decorative ink layer disposed on the conductive ink layer, according to one or more embodiments of the present disclosure.

Referring to FIGS. 4A-4C, a variety of structures for the decorative layer 120 of the electronic device 100 depicted in FIG. 1 are contemplated and within the scope of the present disclosure. FIG. 4A depicts cross-sectional view of a glass article 400 including the glass substrate 112 described herein with respect to FIGS. 1-2. As shown, the glass article 400 comprises a decorative ink layer 401 disposed directly onto the second major surface 116 (in some embodiments, directly onto the semi-transparent layer 118 described herein with respect to FIG. 2). The decorative ink layer 401 is patterned such that, after deposition of the decorative ink used to form the decorative ink layer 401, at least portion of the second major surface 116 is exposed. For example, in embodiments, the decorative ink may be deposited in a pattern on the second major surface 116 via inkjet printing. In embodiments, the decorative ink may be sprayed or screen printed onto the second major surface 116 and subsequently patterned (e.g, using a suitable wet or dry etching technique or photolithography) to expose a portion of the second major surface 116. In the depicted embodiment, the decorative ink layer 401 is patterned to form an opening 402 therein to expose a portion of the second major surface 116. The opening 402 may be shaped based on the light source to be coupled to the glass article 400 (e.g., the opening 402 may conform in shape to a display or other light source used to form a backlit icon).

The glass article 400 is depicted to further comprise a conductive ink layer 404 disposed on the second major surface 116 and patterned into a plurality of sensing structures 406 (e.g, electrodes, conductive traces, etc.). As shown in FIG. 4A, the plurality of sensing structures 406 are disposed in the opening 402 formed in the decorative ink layer 401. As a result, in the embodiment depicted in FIG. 4A, both the decorative ink layer 401 and the conductive ink layer 404 are disposed directly onto the same surface of the glass article 400 (the second major surface 116 in the depicted embodiment). In such embodiments, a transparent conductive ink (e.g., comprising a fused nanowire conductive network and an optical transmission of greater than or equal to 20% throughout the visible spectrum, or other suitable ink) may be beneficially used to minimize obscuration of a light source (e.g., display panel or other suitable light source) disposed on the decorative ink layer 401 and the conductive ink layer 404. In embodiments, a non-transparent conductive ink may be used for the plurality of sensing structures 406, though, in such embodiments, it may be beneficial to limit a maximum dimension of the plurality of sensing structures 406, in a direction parallel to the second major surface 116, to less than or equal to 100 μm, so as to limit the visibility of the plurality of sensing structures. When the conductive ink is disposed directly onto the glass substrate 112, it may be beneficial if the conductive ink comprises a relatively low curing temperature (e.g., of less than or equal to 150° C.) so as to prevent degradation of the strength of the glass substrate 112. As shown in FIG. 4A, the remaining portions of the conductive and decorative inks may not contact one another after patterning. Such a configuration may facilitate a process where both the decorative and conductive inks are deposited (e.g., via inkjet printing or other suitable technique) and subsequently cured in the same process step.

FIG. 4B schematically depicts a glass article 410 comprising the glass substrate 112 described herein with respect to FIGS. 1-2. A decorative ink layer 412 is disposed directly onto the second major surface 116 and a conductive ink layer 414 is disposed directly on the decorative ink layer 412 and in contact with the decorative ink layer 412. The decorative ink layer 412 is disposed between the glass substrate 112 and the conductive ink layer 414. As described herein, the decorative ink layer 412 may have a relatively high optical density (e.g, greater than or equal to 2.0 or greater than or equal to 3.0) and/or relatively low optical transmission (e.g., less than or equal to 20% throughout the visible spectrum). As a result, in the embodiment depicted in FIG. 4B, a plurality of sensing structures 416 formed in the conductive ink layer 414 may not be visible through the glass article 420. Accordingly, non-transparent conductive inks may be used in the embodiment depicted in FIG. 4B. Moreover, the plurality of sensing structures 416 may have relatively large dimensions (e.g., greater than or equal to 100 μm or greater than or equal to 500 μm widths in a direction parallel to the second major surface) to facilitate fabricating a wide variety of touch sensor circuit structures.

In embodiments, when the decorative ink layer 412 obscures the view of the conductive ink layer 414, the glass article 410 may include one or more surface features (not depicted) formed on the first major surface 114. The surface features may comprise decorative inks disposed on the first major surface 114, surface modifications (e.g., roughening) of the first major surface 114, or additions to the first major surface 114 (e.g., a light source, a coating). Such surface features may indicate to the user a touch location for interacting with a touch interface formed via the conductive ink layer 414. In embodiments, patterns in in the decorative ink layer 412 may be used to indicate to users where the glass article 410 is touch sensitive. In embodiments, the glass article 410 depicted in FIG. 4B may be used independently of a light source to provide inputs used to control a separate component.

FIG. 4C depicts a cross-sectional view of a glass article 420 including the glass substrate 112 described herein with respect to FIGS. 1 and 2. The glass article 420 is depicted to include a conductive ink layer 422 disposed directly on the second major surface 116 and a decorative ink layer 424 disposed on the conductive ink layer 422. The conductive ink layer 422 is disposed between the glass substrate 112 and the decorative ink layer 424. As shown, the decorative ink layer 424 is patterned to include an opening 426 having a shape corresponding to a light source (e.g., a display panel or other suitable light source). As a result, the conductive ink layer 422 is depicted to include overlapping portions 428 that are covered by (e.g., in contact with) the decorative ink layer 424 and non-overlapping portions 430 that do not directly contact the decorative ink layer 424. In embodiments, the entirety of the conductive ink layer 422 is formed of a transparent conductive ink (e.g., having an optical transmission of greater than or equal to 20%, 30%, 40%, or 50% throughout the visible spectrum), thus rendering any patterns or coloration of the decorative ink layer 424 viewable through the glass substrate 112.

In embodiments, at least the overlapping portions 428 of the conductive ink layer 422 are obscured from view via the decorative ink layer 424, even if non-transparent, provided that the conductive ink used to form the conductive ink layer 422 is color-matched to the decorative ink layer 424. In embodiments, a plurality of different conductive inks are used to form the conductive ink layer 422. For example, a transparent conductive ink may be used to form the non-overlapping portions 430, while a non-transparent conductive ink may be used to form the overlapping portions. Such a construction may facilitate non-conductive inks of relatively high conductivity being used in the overlapping portions 428 to facilitate electrical connections towards the periphery of the glass article 420. In embodiments, sensing structures of larger size (e.g., having maximum widths greater than or equal to 500 μm) may be formed in the overlapping portions 428 of the conductive ink layer 422 due to their obscuration via the color-matched decorative ink layer 424.

Glass articles including any combination of the conductive ink and decorative ink layers depicted in FIGS. 4A-4C are also contemplated and within the scope of the present disclosure. For example, in embodiments, decorative ink may be disposed on at least some of the plurality of sensing structures 406 depicted in FIG. 4A to conceal at least a portion of the conductive ink layer 404. In embodiments, a decorative layer may comprise a first region formed as depicted in FIG. 4B (e.g., between the glass substrate and a conductive ink layer), and a second region formed as depicted in FIG. 4A or 4C (e.g., either as a sole ink layer disposed on the glass substrate in that region or disposed on a conductive ink layer). Decorative and conductive inks may directly contact different portions of glass substrates and also be stacked in different orders on different regions of the glass substrates to provide flexibility in forming a desired touch sensor structure spanning multiple ink layers. For example, a conductive ink layer may comprise a first portion disposed directly onto a major surface of a glass substrate, and a second portion disposed directly onto a decorative ink layer, such that the conductive ink layer is disposed in multiple planes (e.g., at multiple distances from a major surface of the glass substrate). Such a structure may facilitate making conductive connections and/or forming a particular touch sensing circuit structure.

Figure 5:
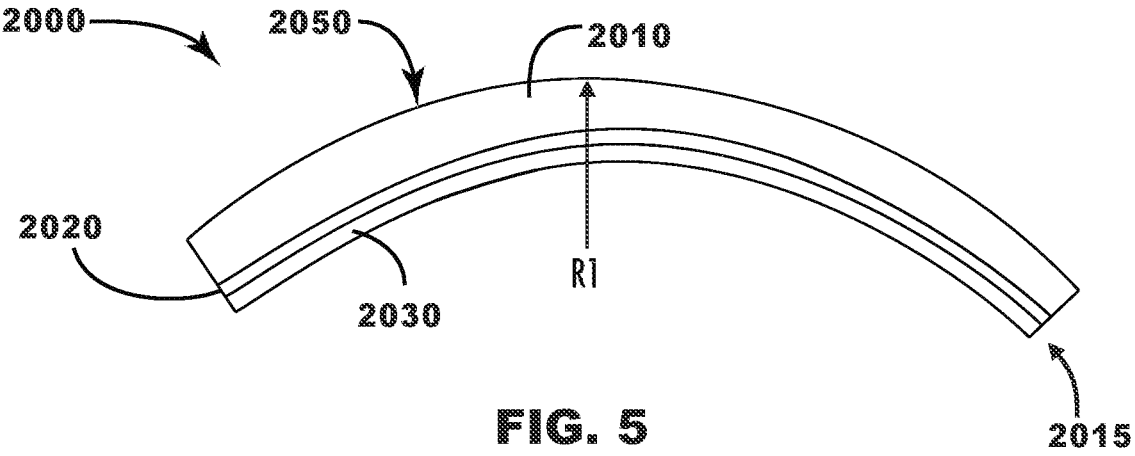
FIG. 5 schematically depicts a side view of a cold-formed glass article comprising a decorative layer with an integrated tough sensor, according to one or more embodiments of the present disclosure.

While FIGS. 1-4C depicted planar sheet-shaped glass substrates, it should be understood that alternative embodiments are envisioned where glass articles including the integrated touch interfaces described herein include curved substrates. For example, FIG. 5 schematically depicts a side-view of a glass article 2000 comprising a cold-formed glass sheet 2010 (e.g., corresponding to a cold-formed version of the glass article 106 in the example described herein with respect to FIGS. 1-2) having at least a first radius of curvature, R1, and in various embodiments, cold-formed glass sheet 2010 is a complex curved sheet of glass material having at least one additional radius of curvature. In various embodiments, R1 is in a range from about 60 mm to about 1500 mm.

Referring to FIGS. 5-9, various sizes, shapes, curvatures, glass materials, etc. for a glass article 106 along with various processes for forming a curved decorated glass are shown and described. It should be understood, that while FIGS. 5-9 are described in the context of a simplified cold-formed glass article 2000 for ease of explanation, the cold-formed glass article 2000 include any suitable glass article, cold-formed using any suitable technique to have a desired shape.

Cold-formed glass article 2000 comprises a polymer layer 2020 located along an inner, major surface of cold-formed glass sheet 2010. Cold-formed glass article 2000 also comprises a frame 2030 (which may be a metal, plastic, glass, or ceramic material). Still further, cold-formed glass article 2000 may also comprise any of the other layers described above, such as the surface treatment and an optically clear adhesive to attach a light source 108 thereto (as shown in FIG. 1) to the cold-formed glass article 2000. Additionally, cold-formed glass article 2000 may comprise such layers as, e.g., light guide layers, reflector layers, display module(s), display stack layers, light sources, etc. that otherwise may be associated with an electronic device as discussed herein.

In embodiments, the cold-formed glass article 2000, comprising the cold-formed glass sheet 2010, polymer layer 2020, frame 2030, and any other optional layers may be cold-formed together to a curved shape, as shown in FIG. 5. In other embodiments, cold-formed glass sheet 2010 may be formed to a curved shape (e.g., via application of force thereto via a die, vacuum fixture, or other suitable technique), and then the polymer layer 2020 and frame 2030 are applied following curve formation.

Figure 6:
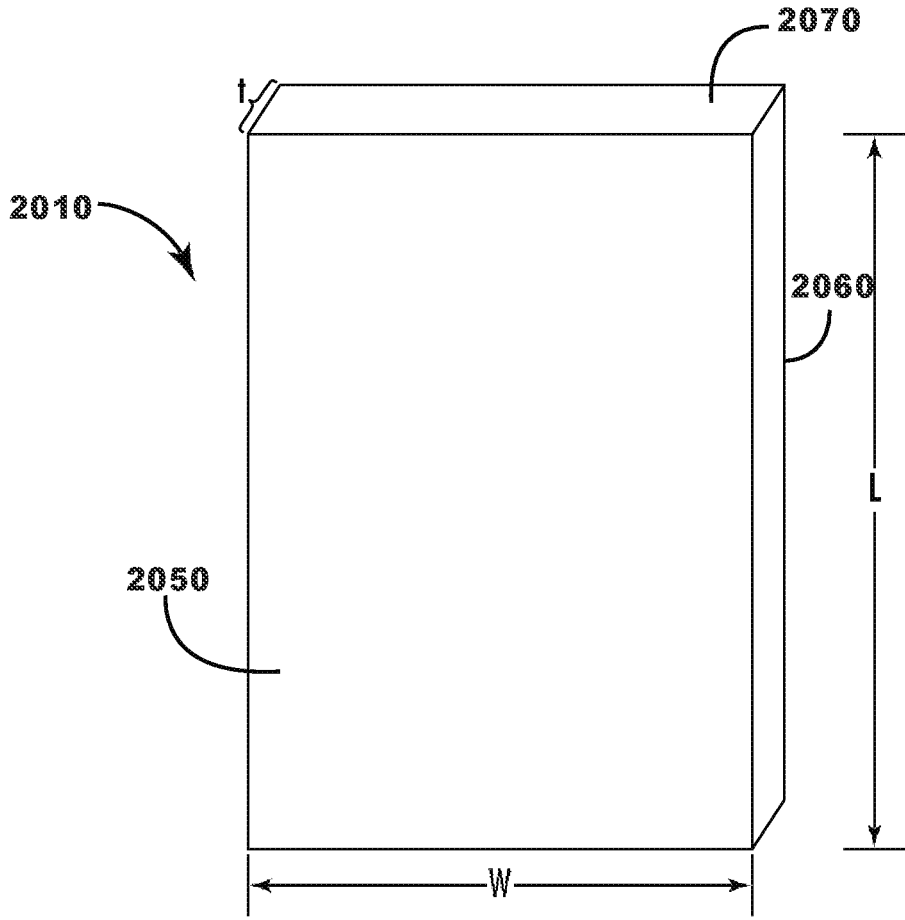
FIG. 6 is a front perspective view of a glass sheet of the cold-formed glass article of FIG. 5 prior to being cold-formed, according to one or more embodiments of the present disclosure.

Referring to FIG. 6, outer cold-formed glass sheet 2010 is shown prior to being formed to the curved shape shown in FIG. 6. In general, Applicant believes that the articles and processes discussed herein provide high quality decorated glass structures utilizing glass of sizes, shapes, compositions, strengths, etc. not previously provided.

As shown in FIG. 6, cold-formed glass sheet 2010 comprises a first major surface 2050 and a second major surface 2060 opposite first major surface 2050. An edge surface or minor surface 2070 connects the first major surface 2050 and the second major surface 2060. Cold-formed glass sheet 2010 has a thickness (t) that is substantially constant and is defined as a distance between the first major surface 2050 and the second major surface 2060. In some embodiments, the thickness (t) as used herein refers to the maximum thickness of the cold-formed glass sheet 2010. Cold-formed glass sheet 2010 comprises a width (W) defined as a first maximum dimension of one of the first or second major surfaces orthogonal to the thickness (t), and outer cold-formed glass sheet 2010 also comprises a length (L) defined as a second maximum dimension of one of the first or second surfaces orthogonal to both the thickness and the width. In other embodiments, the dimensions discussed herein are average dimensions.

In one or more embodiments, cold-formed glass sheet 2010 has a thickness (t) that is in a range from 0.05 mm to 2 mm. In various embodiments, cold-formed glass sheet 2010 has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, cold-formed glass sheet 2010 has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, cold-formed glass sheet 2010 has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

As shown in FIG. 5, cold-formed glass sheet 2010 is shaped to a curved shaping having at least one radius of curvature, shown as R1. In various embodiments, cold-formed glass sheet 2010 may be shaped to the curved shape via any suitable process, comprising cold-forming and hot-forming.

In specific embodiments, cold-formed glass sheet 2010 is shaped to the curved shape shown in FIG. 5, either alone, or following attachment to the frame 2030 via the polymer layer 2020, via a cold-forming process. As used herein, the terms "cold-bent," "cold-bending" "cold-formed" or "cold-forming" refers to curving the glass decorated glass at a cold-form temperature which is less than the softening point of the glass (as described herein). A feature of a cold-formed glass layer is an asymmetric surface compressive between the first major surface 2050 and the second major surface 2060. In some embodiments, prior to the cold-forming process or being cold-formed, the respective compressive stresses in the first major surface 2050 and the second major surface 2060 are substantially equal.

In some such embodiments in which cold-formed glass sheet 2010 is unstrengthened, the first major surface 2050 and the second major surface 2060 exhibit no appreciable compressive stress, prior to cold-forming. In some such embodiments in which cold-formed glass sheet 2010 is strengthened (as described herein), the first major surface 2050 and the second major surface 2060 exhibit substantially equal compressive stress with respect to one another, prior to cold-forming. In one or more embodiments, after cold-forming the compressive stress on the second major surface 2060 (e.g., the concave surface following bending) increases (i.e., the compressive stress on the second major surface 2060 is greater after cold-forming than before cold-forming).

Without being bound by theory, the cold-forming process increases the compressive stress of the glass article being shaped to compensate for tensile stresses imparted during bending and/or forming operations. In one or more embodiments, the cold-forming process causes the second major surface 2060 to experience compressive stresses, while the first major surface 2050 (e.g., the convex surface following bending) experiences tensile stresses. The tensile stress experienced by the first major surface 2050 following bending results in a net decrease in surface compressive stress, such that the compressive stress in the first major surface 2050 of a strengthened glass sheet following bending is less than the compressive stress in the first major surface 2050 when the glass sheet is flat.

Further, when a strengthened glass sheet is utilized for cold-formed glass sheet 2010, the first major surface and the second major surface (2050, 2060) are already under compressive stress, and thus first major surface 2050 can experience greater tensile stress during bending without risking fracture. This allows for the strengthened embodiments of cold-formed glass sheet 2010 to conform to more tightly curved surfaces (e.g., shaped to have smaller R1 values).

In various embodiments, the thickness of cold-formed glass sheet 2010 is tailored to allow cold-formed glass sheet 2010 to be more flexible to achieve the desired radius of curvature. Moreover, a thinner cold-formed glass sheet 2010 may deform more readily, which could potentially compensate for shape mismatches and gaps that may be created by the shape of a support or frame (as discussed below). In one or more embodiments, a thin and strengthened cold-formed glass sheet 2010 exhibits greater flexibility especially during cold-forming. The greater flexibility of the glass articles discussed herein may allow for consistent bend formation without heating.

In various embodiments, cold-formed glass sheet 2010 may have a compound curve comprising a major radius and a cross curvature. A complexly curved cold-formed glass sheet 2010 may have a distinct radius of curvature in two independent directions. According to one or more embodiments, the complexly curved cold-formed glass sheet 2010 may thus be characterized as having "cross curvature," where the cold-formed glass sheet 2010 is curved along an axis (i.e., a first axis) that is parallel to a given dimension and also curved along an axis (i.e., a second axis) that is perpendicular to the same dimension. The curvature of the cold-formed glass sheet 2010 can be even more complex when a significant minimum radius is combined with a significant cross curvature, and/or depth of bend.

Figure 7:
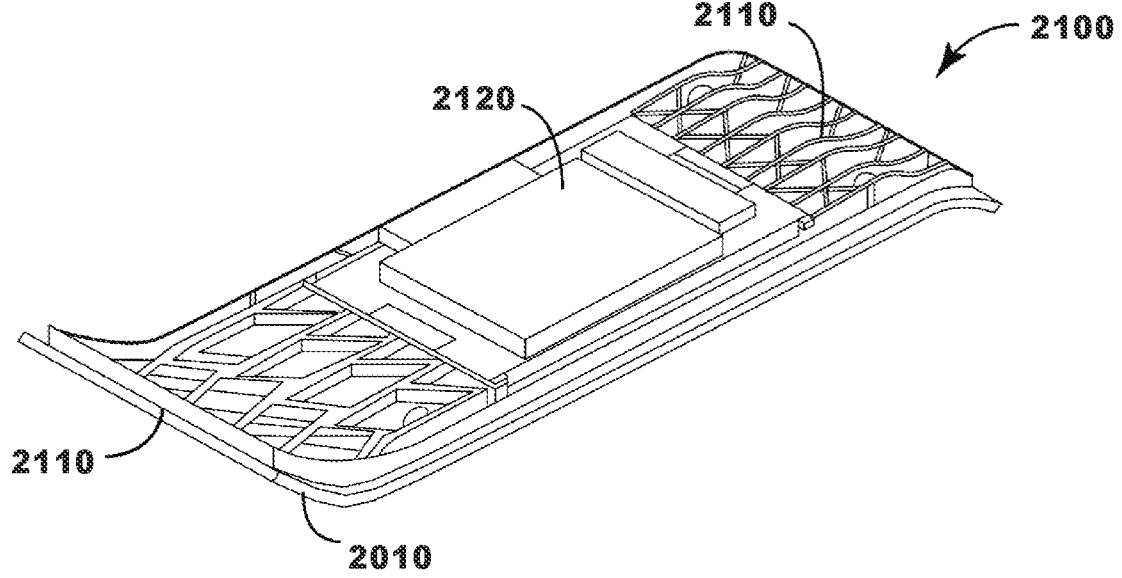
FIG. 7 shows the cold-formed glass article of FIG. 6 shaped to conform to a support surface of a frame, according to one or more embodiments of the present disclosure.

Referring to FIG. 7, a display assembly 2100 is shown according to an exemplary embodiment. In the embodiment shown, the display assembly 2100 comprises a frame 2110 supporting (either directly or indirectly) both a light source, shown as a display module 2120, and the cold-formed glass article 2000. As shown in FIG. 7, cold-formed glass article 2000 and display module 2120 are coupled to frame 2110, and display module 2120 is positioned to allow a user to view light, images, etc. generated by display module 2120 through the cold-formed glass article 2000 (e.g., the frame 2110 may comprise a display opening to render the display module 2120 viewable through the cold-formed glass article 2000). In various embodiments, frame 2110 may be formed from a variety of materials such as plastic (PC/ABS, etc.), metals (Al-alloys, Mg-alloys, Fe-alloys, etc.), glass, or ceramic. The frame 2110 may comprise a structural rigidity greater than that of the cold-formed glass sheet 2010 so as to retain the cold-formed glass sheet 2010 in a cold-formed shape despite bending stresses being present in the cold-formed glass sheet 2010. Various processes such as casting, machining stamping, injection molding, etc. may be utilized to form the curved shape of frame 2110. While frame 2110 is shown as a frame associated with a display assembly, frame 2110 may be any support or frame structure associated with a vehicle interior system.

In various embodiments, the systems and methods described herein allow the cold-formed glass article 2000 to conform to a wide variety of curved shapes that frame 2110 may have. As shown in FIG. 7, the frame 2110 has a support surface 2130 that has a curved shape, and cold-formed glass article 2000 is shaped to match the curved shape of support surface 2130. As will be understood, cold-formed glass article 2000 may be shaped into a wide variety of shapes to conform to a desired frame shape of a display assembly 2100, which in turn may be shaped to fit the shape of a portion of a vehicle interior system, as discussed herein.

In one or more embodiments, cold-formed glass article 2000 (and specifically cold-formed glass sheet 2010) is shaped to have a first radius of curvature, R1, of about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, support surface 2130 has a second radius of curvature of about 60 mm or greater. For example, the second radius of curvature of support surface 2130 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, cold-formed glass article 2000 is cold-formed to exhibit a first radius curvature, R1, that is within 10% (e.g., about 10% or less, about 9% or less, about 8% or less, about 7% or less, about 6% or less, or about 5% or less) of the second radius of curvature of support surface 2130 of frame 2110. For example, support surface 2130 of frame 2110 exhibits a radius of curvature of 1000 mm, cold-formed glass article 2000 is cold-formed to have a radius of curvature in a range from about 900 mm to about 1100 mm.

In one or more embodiments, first major surface 2050 and/or second major surface 2060 of cold-formed glass sheet 2010 comprises a surface treatment or a functional coating. The surface treatment may cover at least a portion of first major surface 2050 and/or second major surface 2060. Exemplary surface treatments comprise at least one of a glare reduction coating, an anti-glare coating, a scratch resistance coating, an anti-reflection coating, a half-mirror coating, or easy-to-clean coating.

With reference to FIGS. 1 and 7, the decorative layer 120 (disposed on the second major surface 2060 of the cold-formed glass sheet 2010 in accordance with the example depicted in FIG. 7) may be used to obscure the frame 2110 from view and provide touch functionality to the display module 2120 without a separate touch panel substrate. For example, the one or more conductive ink portions 124 may at least partially overlap the display module 2120 and also be used to form conductive traces that overlap the frame 2110 to facilitate conductive connections with the touch sensing circuit providing the touch functionality. Moreover, the decorative ink portions 122 may be used to conceal the frame 2110 from view when users are viewing the display assembly 2100 from the side of the cold-formed glass article 2000.

In embodiments, the frame 2110 can include one or more openings other than an opening overlapping the display module 2120. Additional light sources (e.g., LEDs or LED arrays) may be disposed in such openings, and the decorative layer 120 may include additional conductive ink portions forming electrodes overlapping the openings in the frame 2110. This way, the display assembly 2100 may be used to provide additional means for the user to provide inputs to an incorporating system. The decorative layer 120 beneficially facilitates the display assembly 2100 incorporating both a touch display and additional touch elements (e.g., backlit touch icons, decorated portions of cold-formed glass article 2000) for controlling various elements of a vehicle interior system (e.g., a sound system, an HVAC system, other driving controls). By avoiding the need for a separate touch panel substrate, the decorative layer 120 described herein facilitates providing touch functionality in areas not overlapping a display all in a single layer of the display assembly 2100.

Referring to FIG. 8, a flow diagram of a method 3000 of fabricating a glass article is depicted, according to an example embodiment of the present disclosure. In embodiments, the method 3000 may be performed to fabricate the glass article 106 used in the electronic device 100 described herein with respect to FIGS. 1-2. In embodiments, the glass article 106 may be cold-formed and implemented in a curved display assembly, such as the display assembly 2100 described herein with respect to FIG. 7. Accordingly, reference to various components described with respect to FIGS. 1, 2, and 7 will be made to aid in the description of the method 3000. It should be appreciated that the method 3000 may be used to fabricate glass articles other than those depicted in FIGS. 1, 2, and 7 and described herein. The method 3000 may be used to fabricate any glass article comprising a decorative layer including decorative and conductive inks to form an integrated touch sensor or interface.

At block 3002, a decorative ink is disposed on the second major surface 116 of the glass substrate 112 in a first pattern to form the one or more decorative ink portions 122 described herein. In embodiments, the decorative ink may be deposited on the second major surface 116 using any suitable technique, such as inkjet printing, slot sprinting, screen printing, pad printing or gravure printing. The decorative ink may be patterned to form the one or more decorative ink portions 122 either during deposition (e.g., when deposited using inkjet printing techniques) or after deposition via removal of a portion of a decorative ink layer (e.g., via a suitable wet or dry etching process). In embodiments, the decorative ink comprises a suitable commercially available decorative ink and/or comprise inorganic or dielectric pigments in a suitable dispersion medium. For example, in embodiments, the decorative ink comprises a black ink (e.g., a CMYK composite black ink, a CMYK rich black ink, a K black ink, or a LK black ink). As described herein with respect to FIGS. 3A and 3B, the one or more decorative ink portions 122 form any suitable shape to accommodate various light sources in view of a desired functionality of the glass article 106. For example, the one or more decorative ink portions 122 may be patterned to form the display viewing region 308 and border region 305 described herein with respect to FIG. 3A. The border region 305 may be used to conceal components (e.g., a structural frame or housing, electrical connections) from view, while the display viewing region 308 may have a higher optical transmission to facilitate integration of a light source to implement the glass article 106 as a component of a touch display or a touch backlit icon.

At block 3004, a conductive ink is disposed on the second major surface 116 of the glass substrate 112 in a second pattern to form the one or more conductive ink portions 124 described herein. The conductive ink may generally include a conductive material (e.g., metal nanoparticles, metal nanowires, carbon nanotubes, a conductive polymer material) dispersed in a suitable dispersion medium (e.g., including a suitable organic binder and dilution solvent) based on the deposition method to be used. In embodiments, for example, the binder may be selected such that the conductive ink has a viscosity suitable for inkjet printing. Other suitable techniques may be used to deposit the conductive ink on the second major surface 116 (e.g, screen printing, spraying, spin coating). In embodiments, the one or more conductive ink portions 124 are formed during deposition of the conductive ink. In embodiments, the one or more conductive ink portions 124 are formed after curing of the conductive ink via a suitable wet or dry etching process. The one or more conductive ink portions 124 may form any suitable component of a touch sensor circuit to provide a desired touch functionality to the glass article 106.

In embodiments, the conductive and decorative inks may be deposited on the glass substrate 112 simultaneously. For example, multiple print heads may be used to deposit the decorative and conductive inks at the same time in the first and second patterns, respectively. In embodiments, a concentration of an electrically conductive material in an ink may be selectively controlled such that the same print head may be used to form both the one or more decorative ink portions 122 and the one or more conductive ink portions 124. Such simultaneous deposition of the conductive and organic inks may increase production efficiency by avoiding the need for separate ink deposition steps.

At block 3006, the conductive and decorative inks are cured after disposal on the glass substrate 112. In embodiments, the conductive and decorative inks are cured sequentially (e.g, separately) to facilitate disposal of the inks on top of one another in any of the sequences described herein. For example, as described herein with respect to FIG. 4B, the conductive ink may be disposed on top of the decorative ink after the decorative ink is deposited onto the glass substrate 112. In such embodiments, the decorative ink may be cured via any suitable technique (e.g., drying, heating, exposure to radiation of a suitable wavelength) prior to deposition and patterning of the conductive ink. In embodiments, the conductive ink may be deposited and cured prior to deposition and patterning of the decorative ink to facilitate construction of a decorative layer as described herein with respect to FIG. 4C. Embodiments are also contemplated where the decorative and conductive inks are cured simultaneously after deposition onto the glass substrate 112. Embodiments are also envisioned where at least one of the conductive ink and the decorative ink is cured during the deposition steps thereof. For example, the glass substrate 112 may be maintained at a temperature that causes the decorative ink or the conductive ink to cure after disposal on the glass substrate 112.

In embodiments, the glass article 106 includes a plurality of conductive ink layers and a plurality of decorative ink layers. As will be appreciated, blocks 3004 and 3006 may be repeated any suitable number of times based on a desired structure of the decorative layer 120. Alternatively or additionally, in embodiments, only a portion of a conductive ink layer or a decorative ink layer may be deposited on the glass substrate 112 prior to disposal of the other of the decorative ink layer and the conductive ink layer on the glass substrate 112. For example, a conductive ink layer may be disposed on a partial decorative ink layer such that a first portion of the conductive ink layer is disposed directly on the glass substrate 112, while a second portion of the conductive ink layer is disposed on the partial decorative ink layer (e.g., to conceal the second portion of the conductive ink layer). Any suitable combination of deposition and curing steps for the conductive and decorative inks may be used to form glass article with a desired decorative pattern with an integrated touch sensor.

In embodiments, rather than being disposed directly on the second major surface 116 of the glass substrate 112, the decorative and conductive inks are disposed on the semi-transparent layer 118. The semi-transparent layer 118 may conceal the one or more conductive ink portions 124 by reducing the overall light transmission of the glass article 106. Such concealing may permit use of non-transparent conductive inks and/or formation of sensing structures having relatively large dimensions (e.g., greater than or equal to 500 μm) without being noticed when the glass article 106 is in use as a cover substrate. Accordingly, the method 3000 optionally includes depositing the semi-transparent layer 118 onto the second major surface 116. The semi-transparent layer 118 may take the form described in International Patent Application Publication No. WO2020/205519 A1, entitled "Decorated Glass Having a Printed Ink Layer," hereby incorporated by reference in its entirety.

At block 3008, an additional surface treatment may be applied to one or more of the first major surface 114 and the second major surface 116 of the glass substrate 112. The additional surface treatment may be applied prior to or after deposition of the conductive ink and the decorative ink. For example, in embodiments, one or more of an anti-fingerprint coating, an anti-reflection coating, and an anti-glare surface treatment may be applied to the first major surface 114 prior to deposition of the conductive and decorative inks on the second major surface 116. In embodiments, the anti-glare treatment (e.g. via a chemical etching technique) is applied to the second major surface 116 prior to the deposition of the conductive and decorative inks on the glass substrate 112.

At block 3110, the glass substrate 112 is cold-formed into a curved shape. As described herein, the glass article 106 may be cold-formed into the cold-formed glass article 2000 described herein with respect to FIGS. 5-7 by attachment to the frame 2030 with a suitable curved shape. The frame 2030 may be formed via any suitable technique such that the cold-formed glass article 2000 is cold-formed to match a contour of an incorporating system (e.g, a vehicle interior system). Any suitable method may be used for cold-forming the glass substrate. For example, any of the techniques described in U.S. Pre-Grant Publication No. 2019/0329531 A1, entitled "Laminating thin strengthened glass to curved molded plastic surface for decorative and display cover application," U.S. Pre-Grant Publication No. 2019/0315648 A1, entitled "Cold-formed glass article and assembly process thereof," U.S. Pre-Grant Publication No. 2019/0012033 A1, entitled "Vehicle interior systems having a curved cover glass and a display or touch panel and methods for forming the same," and U.S. patent application Ser. No. 17/214,124, entitled "Curved glass constructions and methods for forming same," which are hereby incorporated by reference in their entireties, in addition to others, may be used to cold-form the glass substrates described herein.

Glass Materials

The various glass layer(s) of the decorated glass discussed herein, such as the glass substrate 112 and the cold-formed glass sheet 2010, may be formed from any suitable glass composition comprising soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may comprise $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition comprises $Al_2O_3$ in an amount greater than about 4 mol %, or greater than about 5 mol %. In one or more embodiments, the glass composition comprises $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or comprising an aluminosilicate glass composition. In such embodiments, the glass composition or article formed therefrom comprises $SiO_2$ and $Al_2O_3$ and is not a soda lime silicate glass. In this regard, the glass composition or article formed there from comprises $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about. 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and comprising 2 mol %, 1.5 mol %, 1 mol %, or 0.5 mol %. In one or more embodiments, the glass composition is substantially free of $P_2O_5$.

In one or more embodiments, the glass composition may comprise a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition comprises a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may comprise the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition comprises $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition comprises less than about 4 mol % $K_2O$, less than about 3 mol % $K_2O$, or less than about 1 mol % $K_2O$. In some instances, the glass composition may comprise $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may comprise a total amount of RO (which is the total amount of alkaline earth metal oxide such as CaO, MgO, BaO, ZnO and SrO) in a range from about 0 mol % to about 2 mol %. In some embodiments, the glass composition comprises a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition comprises CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may comprise an oxide that imparts a color or tint to the glass articles. In some embodiments, the glass composition comprises an oxide that prevents discoloration of the glass article when the glass article is exposed to ultraviolet radiation. Examples of such oxides comprise, without limitation oxides of: Ti, V, Cr, Mn, Fe, Co, Ni, Cu, Ce, W, and Mo.

In one or more embodiments, the glass composition comprises Fe expressed as $Fe_2O_3$, wherein Fe is present in an amount up to (and comprising) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition comprises $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition comprises $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be comprised in the amounts otherwise disclosed herein.

Strengthened Glass Properties

In one or more embodiments, cold-formed glass sheet 2010 or other glass layer of any of the decorated glass embodiments discussed herein may be formed from a strengthened glass sheet or article. In one or more embodiments, the glass articles used to form the layer(s) of the decorated glass structures discussed herein may be strengthened to comprise compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the decorated glass structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the decorated glass structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may comprise more than one type of larger ion (e.g., Na+ and K+) or a single larger ion. It will be appreciated by those skilled in the art that parameters for the ion exchange process, comprising, but not limited to, bath composition and temperature, immersion time, the number of immersions of the glass article in a salt bath (or baths), use of multiple salt baths, additional steps such as annealing, washing and the like, are generally determined by the composition of the glass layer(s) of a decorated glass structure (comprising the structure of the article and any crystalline phases present) and the desired DOC and CS of the glass layer(s) of a decorated glass structure that results from strengthening.

Exemplary molten bath composition may comprise nitrates, sulfates, and chlorides of the larger alkali metal ion. Typical nitrates comprise $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the decorated glass may be immersed in a molten salt bath of 100% $NaNO_3$, 100% $KNO_3$, or a combination of $NaNO_3$ and $KNO_3$ having a temperature from about 370° C. to about 480° C. In some embodiments, the glass layer(s) of a decorated glass may be immersed in a molten mixed salt bath comprising from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the decorated glass structures may be immersed in a molten, mixed salt bath comprising $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a decorated glass structure. The spike may result in a greater surface CS value. This spike can be achieved by single bath or multiple baths, with the bath(s) having a single composition or mixed composition, due to the unique properties of the glass compositions used in the glass layer(s) of a decorated glass structure described herein.

In one or more embodiments, where more than one monovalent ion is exchanged into the glass articles used to form the layer(s) of the decorated glass structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the decorated glass structures may be strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the glass articles used to form the layer(s) of the decorated glass structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the decorated glass structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Embodiments of the present disclosure may be further understood in view of the following aspects:

A first aspect of the present disclosure includes a glass article comprising: a glass substrate having a first major surface and a second major surface, the second major surface being opposite the first major surface; a decorative ink layer disposed on the second major surface of the decorative ink layer, the decorative ink layer comprising a colorant; and a conductive ink layer disposed on the second major surface, wherein: the conductive ink layer comprises conductive material dispersed in a dispersion medium and a sheet resistance that is less than a sheet resistance of the decorative ink layer, and the conductive ink layer comprises a plurality of sensing structures arranged in a touch sensing circuit configured to vary in electrical properties in response to electromagnetic interactions with an external object.

A second aspectofthepresentdisclosureincludesaglassar-ticleaccordingtothefirst aspect, wherein the glass substrate comprises at least one of soda lime glass, aluminosilicate glass, borosilicate glass, boroaluminosilicate glass, alkali-containing aluminosilicate glass, alkali-containing borosili-cate glass, or alkali-containing boroaluminosilicate glass.

A third aspect of the present disclosure includes a glass article according to any of the first through the second aspects, wherein both the conductive ink layer and the decorative ink layer directly contact the second major surface.

A fourth aspect of the present disclosure includes a glass article according to any of the first through the third aspects, wherein: the glass substrate comprises a thickness extending between the first major surface and the second major surface that is less than or equal to 1.0 mm, and the glass substrate is chemically strengthened.

A fifth aspect of the present disclosure includes a glass article according to any of the first through the fourth aspects, wherein the conductive ink layer is disposed on the decorative ink layer and not in contact with the second major surface.

A sixth aspect of the present disclosure includes a glass article according to any of the first through the fifth aspects, wherein: the decorative ink layer comprises an optical transmission throughout the visible spectrum that is less than that of the conductive ink layer, and an interior boundary of the decorative ink layer defines a display viewing region of the second major surface that is not covered by the decora-tive ink layer.

A seventh aspect of the present disclosure includes a glass article according to any of the first through the sixth aspects, wherein, within the display viewing region, the glass article exhibits a transmittance of greater than or equal to 20% throughout the visible spectrum for light normally incident on the first major surface of the glass article.

An eighth aspect of the present disclosure includes a glass article according to any of the first through the seventh aspects, wherein at least some of the plurality of sensing structures are disposed on the display viewing region.

A ninth aspect of the present disclosure includes a glass article according to any of the first through the eighth aspects, wherein the conductive material comprises a plu-rality of conductive nanowires, carbon nanotubes, or con-ductive polymers.

A tenth aspect of the present disclosure includes a glass article according to any of the first through the ninth aspects, wherein the colorant comprises an inorganic material or a dielectric material.

An eleventh aspect of the present disclosure includes a glass article according to any of the first through the tenth aspects, further comprising a frame attached to the glass substrate such that the frame retains the glass substrate in a curved configuration to form an asymmetric stress distribu-tion in the glass substrate.

A twelfth aspect of the present disclosure includes a glass article according to any of the first through the eleventh aspects, wherein: the decorative ink layer defines a shape of an icon visible through the glass article, and at least some of the plurality of sensing structures are disposed within the icon such that an interaction with the glass article on the icon changes the electrical properties.

A thirteenth aspect of the present disclosure includes a glass article according to any of the first through the twelfth aspects, wherein the icon defines a touch sensitive vehicle control icon.

A fourteenth aspect of the present disclosure includes a glass article according to any of the first through the thir-teenth aspects, further comprising a semi-transparent layer disposed on the second major surface and overlapping the conductive ink layer.

A fifteenth aspect of the present disclosure includes a vehicle interior system comprising: a glass substrate com-prising a decorative layer disposed on a major surface of the glass substrate, the decorative layer comprising a decorative ink and a conductive ink comprising a conductive material dispersed in a dispersion medium such that the conductive ink comprises a sheet resistance that is less than that of the decorative ink, wherein the conductive ink is patterned into a plurality of sensing structures arranged in a touch sensing circuit; a light source configured to emit light towards the major surface, wherein the decorative layer is disposed between the glass substrate and the light source; and a circuit board conductively connected to the light source and the touch sensing circuit formed by the plurality of sensing structures of the decorative layer.

A sixteenth aspect of the present disclosure includes a vehicle interior system according to the fifteenth aspect, wherein: the decorative ink comprises an optical transmission that is less than that of the conductive ink throughout the visible spectrum, and the decorative ink defines a boundary of a display viewing region of the glass substrate that is not covered by the decorative ink.

A seventeenth aspect of the present disclosure includes a vehicle interior system according to any of the fifteenth through the sixteenth aspects, wherein the light source comprises a display panel configured to emit light over an entirety of the display viewing region.

An eighteenth aspect of the present disclosure includes a vehicle interior system according to any of the fifteenth through the seventeenth aspects, wherein at least some of the plurality of sensing structures are disposed on the display viewing region.

A nineteenth aspect of the present disclosure includes a vehicle interior system according to any of the fifteenth through the eighteenth aspects, further comprising a semi-transparent layer disposed on the major surface between the glass substrate and the decorative layer, the semi-transparent layer having an optical transmission of greater than or equal to 5% throughout the visible spectrum.

A twentieth aspect of the present disclosure includes a vehicle interior system according to any of the fifteenth through the nineteenth aspects, wherein both the conductive ink and the decorative ink directly contact the major surface.

A twenty first aspect of the present disclosure includes a vehicle interior system according to any of the fifteenth through the twentieth aspects, wherein the conductive ink is disposed on the decorative ink and not in contact with the major surface.

A twenty second aspect of the present disclosure includes a vehicle interior system according to any of the fifteenth through the twenty first aspects, wherein the conductive material comprises a plurality of conductive nanowires, carbon nanotubes, or conductive polymers.

A twenty third aspect of the present disclosure includes a vehicle interior system according to any of the fifteenth through the twenty second aspects, wherein the colorant comprises an inorganic material or a dielectric material.

A twenty fourth aspect of the present disclosure includes a method of fabricating a glass article comprising disposing a decorative ink in a first pattern on a major surface of a glass substrate, wherein the decorative ink comprises a colorant; disposing a conductive ink in a second pattern on the major surface, wherein the second pattern comprises a plurality of sensing structures of the conductive ink that are arranged in a touch sensing circuit; and curing the decorative ink and the conductive ink on the major surface to form a decorative layer on the major surface with an integrated touch sensor, wherein, after curing, the conductive ink and the decorative ink comprise sheet resistances that differ from one another.

A twenty fifth aspect of the present disclosure includes a method according to the twenty fourth aspect, wherein disposing the conductive ink in the second pattern comprises applying the decorative ink onto the major surface using an inkjet printer.

A twenty sixth aspect of the present disclosure includes a method according to any of the twenty fourth through the twenty fifth aspects, wherein disposing the conductive ink in the second pattern comprises patterning a layer of the conductive ink disposed on the major surface via photolithography, chemical etching, or laser ablation.

A twenty seventh aspect of the present disclosure includes a method according to any of the twenty forth through the twenty fifth aspects, wherein the decorative ink and the conductive ink are cured sequentially such that one of the decorative ink and the conductive ink contacts a cured version of the other of the decorative ink when in an uncured state.

A twenty eighth aspect of the present disclosure includes a method according to any of the twenty fourth through the twenty seventh aspects, wherein both the decorative ink and the conductive ink directly contact the major surface.

A twenty ninth aspect of the present disclosure includes a method according to any of the twenty fourth through the twenty eighth aspects, wherein the conductive ink is disposed on the decorative ink such that the conductive ink does not directly contact the major surface.

A thirtieth aspect of the present disclosure includes a method according to any of the twenty fourth through the twenty ninth aspects, wherein: after curing, the decorative ink comprises an optical transmission that is less than that of the conductive ink throughout the visible spectrum, and the first pattern delineates a boundary of a display viewing region where the glass article exhibits a greater optical transmission throughout the visible spectrum than outside of the display viewing region.

A thirty first aspect of the present disclosure includes a method according to any of the twenty fourth through the thirtieth aspects, wherein at least some of the plurality of sensing structures are disposed in the display viewing region.

A thirty second aspect of the present disclosure includes a method according to any of the twenty fourth through the thirty first aspects, further comprising cold-forming the glass substrate by attaching the glass substrate to a support structure configured to retain the glass substrate in a curved configuration.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to comprise one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to comprise everything within the scope of the appended claims and their equivalents.

What is claimed is:

1. A glass article comprising:

a glass substrate having a first major surface and a second major surface, the second major surface being opposite the first major surface;

a decorative ink layer disposed on the second major surface of the glass substrate, the decorative ink layer comprising a colorant; and a conductive ink layer disposed on the second major surface of the glass substrate, the conductive ink layer comprising conductive ink portions having a sheet resistance that is less than a sheet resistance of decorative ink portions of the decorative ink layer, wherein at least some of the conductive ink portions form a plurality of sensing structures arranged in a touch sensing circuit configured to vary in electrical properties in response to electromagnetic interactions with an external object, wherein the conductive ink layer does not include a transparent conductive oxide, and wherein (i) both the conductive ink layer and the decorative ink layer directly contact the second major surface, or (ii) the conductive ink layer is disposed on the decorative ink layer and not in contact with the second major surface, and a dimension of the plurality of sensing structures, in a direction parallel to the second major surface, is greater than or equal to 100 μm.

2. The glass article of claim 1, wherein both the conductive ink layer and the decorative ink layer directly contact the second major surface.

3. The glass article of claim 1, wherein the conductive ink layer is disposed on the decorative ink layer and not in contact with the second major surface.

4. The glass article of claim 1, wherein:

the decorative ink layer comprises an optical transmission throughout the visible spectrum that is less than that of the conductive ink layer, and an interior boundary of the decorative ink layer defines a display viewing region of the second major surface that is not covered by the decorative ink layer.

5. The glass article of claim 4, wherein, within the display viewing region, the glass article exhibits a transmittance of greater than or equal to 20% throughout the visible spectrum for light normally incident on the first major surface of the glass article.

6. The glass article of claim 4, wherein at least some of the plurality of sensing structures are disposed on the display viewing region.

7. The glass article of claim 1, wherein the conductive material comprises a plurality of conductive nanowires, carbon nanotubes, or conductive polymers.

8. The glass article of claim 1, wherein the colorant comprises an inorganic material or a dielectric material.

9. The glass article of claim 1, further comprising a frame attached to the glass substrate such that the frame retains the glass substrate in a curved configuration to form an asymmetric stress distribution in the glass substrate.

10. The glass article of claim 1, wherein:

the decorative ink layer defines a shape of an icon visible through the glass article, and at least some of the plurality of sensing structures are disposed within the icon such that an interaction with the glass article on the icon changes the electrical properties.

11. The glass article of claim 10, wherein the icon defines a touch sensitive vehicle control icon.

* * * * *